United States Patent
Testardi

(10) Patent No.: US 6,374,268 B1
(45) Date of Patent: Apr. 16, 2002

(54) METHODS AND SYSTEMS FOR AN INCREMENTAL FILE SYSTEM

(75) Inventor: Rich P. Testardi, Berthoud, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/060,284

(22) Filed: Apr. 14, 1998

(51) Int. Cl.[7] .............................................. G06F 17/30
(52) U.S. Cl. ........................ 707/205; 711/103; 711/170
(58) Field of Search ....................... 707/9–10, 200–205; 711/103, 170

(56) References Cited

U.S. PATENT DOCUMENTS

| | | | |
|---|---|---|---|
| 5,479,654 A | * 12/1995 | Squibb | 707/201 |
| 5,603,011 A | * 2/1997 | Piazza | 711/170 |
| 5,845,281 A | * 12/1998 | Benson et al. | 707/9 |
| 5,946,689 A | * 8/1999 | Yanaka et al. | 707/10 |
| 5,946,700 A | * 8/1999 | Pongracz et al. | 707/203 |
| 5,950,198 A | * 9/1999 | Falls et al. | 707/8 |
| 5,950,209 A | * 9/1999 | Carrier, III et al. | 707/203 |

OTHER PUBLICATIONS

DelRossi, Robert A.; Infoworld, V16, N25, p93 (4); Jun. 20, 1994.*

* cited by examiner

Primary Examiner—Sanjiv Shah
Assistant Examiner—Jean Bolte Fleurantin

(57) ABSTRACT

An incremental files system stores only changed files relative to a base set of read-only files such the each session can manipulate shared files as though dealing with a complete local snapshot copy. In the preferred embodiment, the incremental file system intercepts open/create requests for files in the base set of read-only files. Further read or write access to the original file is then redirected to either the original file or a shadow file copy of the original file in accordance with a delta file. The delta file and the shadow file are both stored in a shadow directory in a local storage area associated with the requesting session. When a session requests access to change the contents of an original file, a delta file and shadow file are located or created in the shadow directory. The shadow file, when created, is initialized with the present contents of the original file. When a session requests read-only access to the original file, the incremental file system checks for the presence of a corresponding delta file. If no corresponding delta file is located, further read requests are satisfied by the original file as stored in the base set of read-only files. If a delta file is found, further read requests are satisfied from access to the shadow file. Requests to read the directory of the base set of read-only files are satisfied by joining the directories of the base set of read-only files and that of the shadow directory and pruning undesired entries from the join.

26 Claims, 5 Drawing Sheets

METHODS AND SYSTEMS FOR AN INCREMENTAL FILE SYSTEM

BACKGROUND OF THE INVENTION

1. Field of the Invention

The present invention relates to data processing system file storage subsystems and in particular to methods and structures for reducing storage requirements and administrative tasks involved with maintaining individual copies of a common base set of files by automatically storing only changes (deltas) made to individual files for each particular user's session.

2. Discussion of Related Art

In the computing arts, it is common that a base set of files stored in a mass storage file system are shared by a number of users or processes. For example, a group of software developers may share access to a common base set of files which represent the product/project under development. Or, for example, groups of analysts may share access to a common base set of financial data files for which they each perform requisite analysis.

Each user or process may, for analysis or development purposes, may wish to independently make relatively small changes in the base set of files. However, frequently in such cases the common base set of shared files is intended to be read only or intended to be updated only in a global manner such that all files will contain a consistent set of information. For example, where a group of software developers work jointly on a software project, the base set of files may represent the current development working version of the software project or product. It is therefore desirable that this base set of files be updated only in a consistent manner. This assures that the common base set of files may be relied upon to be internally consistent as the present operable or released version of the project or product.

A typical solution to this problem as presently known in the art provides that each individual developer in the group maintains his or her own complete snapshot of the base set of files or, at a minimum, a snapshot of each file from the base set of files affected by that developers efforts. Periodically, e.g., nightly or weekly, all developers in the group will coordinate the update of the base set of files to incorporate changes made in their private copies of particular files into the base set of files.

Maintaining a complete snapshot copy of the entire base set of files is costly in terms of storage requirements in the computing enterprise. Where each user/process maintains a complete duplicate set of the base set of files, storage requirements can grow dramatically in proportion to the number of users/processes accessing the common set of files.

This storage cost can be reduced by copying only the subset of files in the base set of files which are actually impacted by the individual's efforts. Other files which are unaffected need not be copied. However, the unaffected files are typically required for use of the base set of files. For example in the software development environment noted above, the build process for the software product or project requires modified (i.e., locally stored) files as well as the remaining unmodified files from the globally stored base set of files. The remaining unmodified files from the base set of files must therefore be "linked" in some manner with the subset of locally copied files affected by the developer's efforts.

This particular problem of linking to unaffected files in the base set of files has been partly addressed in certain development environments (e.g., Unix and Unix dialect systems) by providing for "symbolic links" to portions of the base set of files which are not affected by the individual developers efforts. Symbolic links provide an indirect reference to a file in the base set of files. The indirect reference is a directory entry in the area of storage used to store the local copies of files affected by the developer's efforts. The indirect reference in the local directory points to the actual physical storage in the common repository for the set of base files. The storage for the file is therefore not duplicated for files of the base set of files which are unaffected by the user's modifications.

However, such solutions tend to be uniquely applicable to Unix and Unix dialect systems rather than globally applicable to a wider variety of computing enterprises (such as Microsoft Windows environments). In addition, creating the requisite links is largely a manual process left to the individual engineers (or at best left to an administrator for the engineering group). Such manual processes are prone to error. Further, initially setting up a large number of symbolic links can be time consuming. A large number of such links also uses additional directory (v-node) entries which can be another valuable resource in storage subsystems of Unix environments.

Further, tools which may modify files in the base set of files need to be modified to understand the nature of such symbolic links to create and destroy them as necessary in accordance with the changes made by the user. For example, text editors used for modifying source code files would need to delete a symbolic link in the local directory when the corresponding source code file is modified and re-create a symbolic link if changes to a file are discarded to return the file to its original form. Similarly, a compiler tool would need to destroy symbolic links when a compilation process produces a new object module or in the alternative, all object modules would have to be stored locally thereby again increasing the storage space requirements. Similar problems would arise in applying symbolic links to other exemplary applications as noted above.

Similar problems arise where a base set of files are intended for read-only access but small modifications for each user may be desired. For example, a base set of financial records shared by a group of analysts may be generally intended for read only use. However, each analyst may wish to evaluate a particular option by experimenting with trial versions of files in the base set of files. Such "what if"0 analysis might be unique to each particular analysts area of expertise and operation. Similar solutions have been applied to this environment and similar problems arise in such solutions.

Still another example of a related aspect of the above problems arises where a user wishes to use data stored in a true read-only medium (e.g., CD-ROM data) and to modify the data for their particular application. As above, present solutions involve copying the read-only data in its entirety or at least copying those files which are affected by the user's specific activities and applications and manually linking to unaffected files.

The above identified problems may be viewed more generally as specific examples of a broader problem. Namely, there is a need to provide for changing portions of a base set of files which are not permitted to be changed while minimizing the requirements for storage capacity and minimizing potential for human error in identifying modified and unmodified files.

It is therefore evident from the above discussion that a need exists for an improved architecture to permit individual users or processes read-write access to individual files in a common set of files which, for any of several reasons, are not generally accessible for read-write access.

SUMMARY OF THE INVENTION

The present invention solves the above and other problems, thereby advancing the state of useful arts, by providing an incremental file system (also referred to herein as IFS) structure and associated methods which enable read-write access to individual files in a common base set of read-only files while minimizing the amount of storage required for each individual user's session and minimizing potential for human error by automating the process of creating and destroying links between modified and unmodified versions of files. In the preferred embodiment of the present invention, the incremental file system is integrated with the file system services of the underlying operating system so as to operate in a manner transparent to the user processes which require or read/write access to the common base set of read-only files.

In particular, in the preferred embodiment, the incremental file system of the present invention is implemented as a file system filter module which intercepts file requests for file systems which are managed by the IFS. The intercepted requests are then processed in accordance with the methods of the present invention to provide a user's session with full, read/write access to local, modified versions of files from a base set of read-only files as well as the unmodified files in the base set, transparently as compared to prior techniques requiring manual procedures.

More specifically, methods and structures of the present invention manage a base set of read-only files (also referred to herein as a "shadow drive") by storing copies of files which are modified by the user in a local directory (distinct from the shadow drive). The local directory is also referred to herein as the "shadow directory." The copy of a file stored in the shadow directory for purposes of user modification is also referred to herein as the "shadow file."

When the user attempts to change the contents of a file in the shadow drive, the incremental file system of the present invention creates a "delta file" associated with the original file from the shadow drive. The delta file is stored in the shadow directory and serves only as a flag indicating that the corresponding original file has been changed. The changes made by the user are stored in a shadow file in the shadow directory. The presence of a delta file corresponding to an original file coupled with the absence of a shadow file is indicative of a user modification which deleted the file in its entirety.

The delta file, the corresponding shadow file (if any), and the shadow directory are preferably all stored in a storage region unique to the particular user's session. As used herein, a session refers to a group of related processes as defined by a particular user or a system administrator. For example, in the program development environment noted above, a session may be defined as all processes operating on behalf of a single developer working on a single task (i.e., a program enhancement). The same developer might have a second session defined for working on a second task (i.e., a program bug to be fixed independent of the first task). As is known in the computing arts, such a session may be comprised of several processes such as a program text editor, a compiler, an assembler, a linker/loader, a debugger, etc. Each of these exemplary processes may, in turn, perform its assigned task by spawning still other "child" processes to perform specific subtasks, etc. Session as used herein is therefore intended to broadly encompass a single user, a single process, or any combination of processes that a user or administrator may define as a "session."

Each session therefore has its own "copy" of the base set of read-only files with the changes made by that session. However, unlike prior techniques, storage is reduced by eliminating the need for copying all files of the base set of read-only files and by eliminating the need to create large numbers of symbolic links.

When a user reads data from a file, the IFS of the present invention first attempts to locate a delta file in the shadow directory. If no such delta file is located, the user's read request is satisfied by reading requested data from the original file in the common base set of read-only files. If, on the other hand, a delta file is so located in the shadow directory in response to a user's read request, the IFS of the present invention satisfies the user's read request from the corresponding shadow file stored in the shadow directory.

The IFS of the present invention solves the problems noted above with respect to prior techniques in that, as compared to prior techniques, substantially less storage is required to store changes associated with a particular files in the common base set of read-only files. Furthermore, since the IFS of the present invention is integrated with the operating system's file system services (preferably as a filter module), the present invention obviates the need for using and managing explicit symbolic links as described above with respect to Unix based systems. Each session perceives that a private copy of the base set of read-only files is available and is both readable and writeable by the session.

The IFS of the present invention provides further benefits as compared to prior techniques in that incremental changes made to a common base set of read-only files may be easily deleted ("rolled back"). Simple deletion of the delta files stored locally for a particular session eliminates the changes made by that session. Deletion of individual delta files rolls back the changes to the corresponding files while deletion of all delta files in the shadow directory rolls back all changes made by the session.

The above, and other features, aspects and advantages of the present invention will become apparent from the following descriptions and attached drawings.

DETAILED DESCRIPTION OF THE PREFERRED EMBODIMENTS

Figure 1:
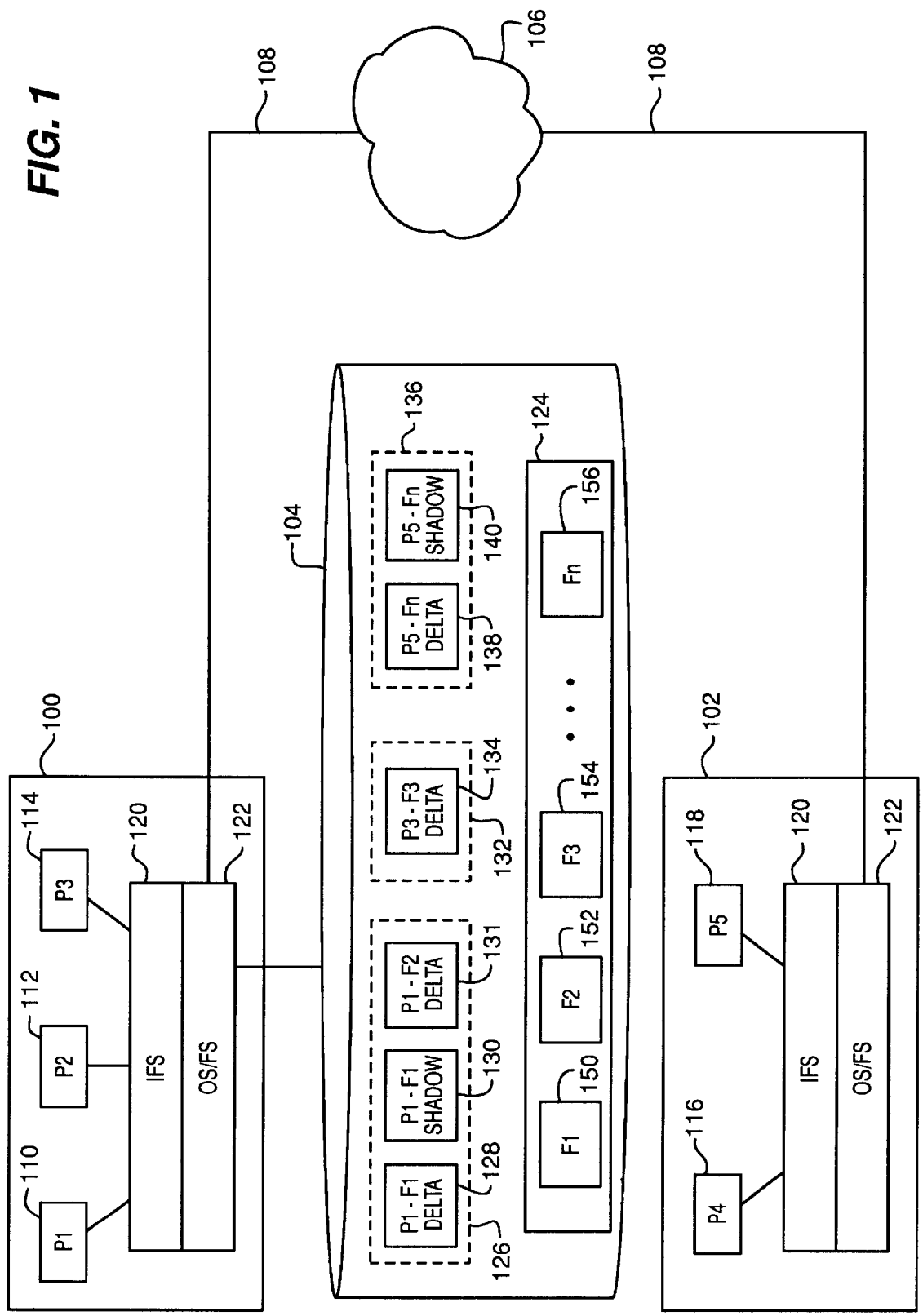
FIG. 1 is a block diagram of data processing systems in which the incremental file system of the present invention is advantageously applied.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of data processing systems 100 and 102 in which the methods and apparatus of the present invention are advantageously applied. System 100 is a data processing system wherein three sessions 110–114 interact with incremental file system 120 of the present invention. Incremental file system 120 (IFS) intercepts file access requests sent from sessions 110–114 directed to the file system portion of operating system 122 (OS/FS). OS/FS 122 directly manipulates files of information stored locally in its mass storage subsystem 104. Mass storage subsystem 104 is coupled to data processing system 100 via path 109.

As noted elsewhere herein, the methods and apparatus of the present invention may be utilized both in conjunction with locally attached storage subsystems as shown in FIG. 1 (data processing system 100 coupled to mass storage subsystem 104), as well as through remote file access techniques known in the art. Such remote file access techniques are exemplified in FIG. 1 as network connection 108 connecting the OS/FS 122 within each of data processing systems 100 and 102 through network 106. Sessions 116 and 118 operable within data processing system 102 manipulate files via IFS 120 and OS/FS 122 transparently through network connection 108 and network 106. The files so manipulated are actually stored on mass storage subsystem 104 locally attached only to data processing system 100 via path 109. Such distributed computing techniques and network file access methods and apparatus are well-known to those skilled in the art.

As noted above, as used herein, a session refers to a group of related processes as defined by a particular user or a system administrator. For example, in the program development environment noted above, a session may be defined as all processes operating on behalf of a single developer working on a single assignment (i.e., a program enhancement). The same developer might have a second session defined for working on a second assignment (i.e., a program bug to be fixed independent of the first assignment). As is known in the computing arts, such a session may be comprised of several processes such as a program text editor, a compiler, an assembler, a linker/loader, a debugger, etc. Each of these exemplary processes may, in turn, perform its assigned task by spawning still other "child" processes to perform specific subtasks, etc. Session as used herein is therefore intended to broadly encompass a single user, a single process, or any combination of processes that a user or administrator may define as a "session."

As described in further detail herein below, IFS 120 intercepts file access requests generated by sessions 110–118 of FIG. 1. IFS 120 then redirects these file access requests in accordance with the methods of the present invention. In particular, IFS 120 permits each session 110–118 to manipulate a base set of read-only files 150–156 stored in a first storage area 124 on mass storage subsystem 104. As noted herein above, each session is permitted read-only access to the base set of read-only files 150–156 stored in the first storage area 124. Such read-only access is common, as noted above, in many applications were the base set of read-only files 150–156 are shared among around multiple sessions 110–118. When a particular session requests file access to a file in the base of files 150–156 which requires modification of the identified file, IFS 120, in accordance with the present invention, creates a shadow copy of the identified file in a second is storage area dedicated to the requesting session.

For example, as shown in FIG. 1, session 110 has requested modification of two files from the base set of read-only files 150–156. IFS 120 has therefore generated appropriate shadow copies and delta information in second storage area 126 uniquely associated with session 110. In like manner, second storage area 132 is associated with session 114, and second storage area 136 is associated with session 118 (operable in data processing system 102). In particular, as detailed further herein below, session 110 has requested modification of the contents of original file 150 thereby causing IFS 120 operable in data processing system 100 to create delta file 128 and shadow file 130 within the second storage area 126. Session 110 has further requested deletion (a form of modification) of original file 152 thereby causing IFS 120 to generate delta file 131 but no corresponding shadow file in second storage area 126. In like manner, on behalf of session 114, IFS 120 generated delta file 134 in second storage area 132 and, on behalf of session 118, created delta file 138 and shadow file 140 in second storage area 136. As noted above, IFS 120 is operable within data processing system 100 to process file access requests from sessions 100–114. Lowerlevel file manipulation generated by IFS 120 are passed through OS/FS 122 also operable and within data processing systems 100 and 102 which, in turn, manipulate files in mass storage system 104 via path 109. IFS 120 is also operable within data processing system 102 to process requests generated by sessions 116 and 118. Lower-level file manipulation generated by IFS 120 in data processing system 102 are passed through OS/FS 122 also operable and within data processing system 102 which, in turn, manipulate files in mass storage system 104 via network connection 108 and network 106 in cooperation with OS/FS 122 operable in data processing system 100.

Incremental File System Intercept Methods

The following pseudo-code listings describe the methods of the present invention in accordance with the best presently known mode of practicing the invention. As noted above, the methods described herein are preferably implemented as an installable file system filter in a Windows computing environment (or equivalently as a file system filter at the v-node layer in Unix operating systems and associated dialects). Related methods, not shown herein, are therefore invoked to install or otherwise dynamically associate the incremental file system of the present invention with the operating system and associated file system modules.

The first pseudo-code listing 1 below describes the operation of a method of the present invention for intercepting create/open file requests directed from a session to the OS/FS of the computing system. Create/open requests for a file in the base set of read-only files are redirected to an appropriate file for actual opening or creation in accordance with the desired access mode and in accordance with the information maintained by the methods of the present invention to implement the shadowing of the shadow drive.

```
//
//Intercept function for OS/FS API create/open function.
//
create( original_file, access_mode)
{
// Determine path to shadow directory for requesting
    session, file
// name of shadow file in shadow directory, and the file name
    for the
// delta file in the shadow directory.
```

```
shadow_directory=construct_shadow_directory(
    requesting_session_id);
shadow_name=concatenate( shadow_directory,
    original_file);
delta_file=concatenate( shadow_name, ".#DELTA#");

if ( original_file is not a directory ) {
    if ( access_mode != read_only ) {
        // not read-only access
        // Create a shadow directory, a delta file,
        // and a shadow file if they don't already
        // exist. Then redirect further access to the
        // shadow file.
        if ( shadow_directory does not exist)
            system_create_directory( shadow_directory );
        if ( delta_file does not exist )
            system_create( delta_file_file );
        if ( shadow_file does not exist) {
            handle = system_create( shadow_file );
            copy( original_file, shadow_file );
        }
        else
            handle = system_open( shadow_file );
    }
    else {   // read-only access
        // If a delta file exists, redirect further
        // read access to the shadow file.
        // Otherwise, direct further read access
        // to the original file.
        if ( delta_file exists in shadow_directory )
            handle = system_open( shadow_file );
        else
            handle = system_open( original_file);
    }
    return handle;
}

// shadowing of directories not presently necessary
return pass_request_to_OS/FS_create( );
}
```

Pseudo-code Listing 1

Pseudo-code listing 2 below describes the operation of a method of the present invention for intercepting directory control requests directed from a session to the OS/FS of the computing system. Directory control requests for a directory (subdirectory) in the base set of read-only files are used to retrieve file information regarding files in the base set of read-only files. The directory entries returned are therefore modified in accordance with the modifications generated by the requesting session and recorded in the shadow directory corresponding to the requesting session.

```
//
// Intercept function for OS/FS API directory control
    requests to the
// base set of read-only files.
//
directory_control ( directory)
{
// Determine path to shadow directory for requesting ses-
    sion.
    shadow_directory=construct_shadow_directory(
        requesting_session_id);
// Get first list of files in accordance with directory control
    request
// and store in a first temporary list.
    first_list=retrieve_directory_entries ( directory);
// Remove entries for which a corresponding delta file
    exists.
    for each entry in first_list
        if ( corresponding delta file exists in shadow directory)
            prune_current_entry_from_list (first_list);
// Get a second list of entries from shadow directory in
    accordance
// with directory control request and store in second list.
    second_list=retrieve_directory_entries ( shadow_
        directory);
// Remove entries which are for subdirectories and which
    are for
// delta files.
    for each entry in second_list
        if ( entry is for a subdirectory or a delta file)
            prune_current_entry_from_list ( second_list);
// Merge the first and second list for return to the request-
    ing session.
    return merge ( first_list, second_list);
}
```

Pseudo-code Listing 2

Figure 2:
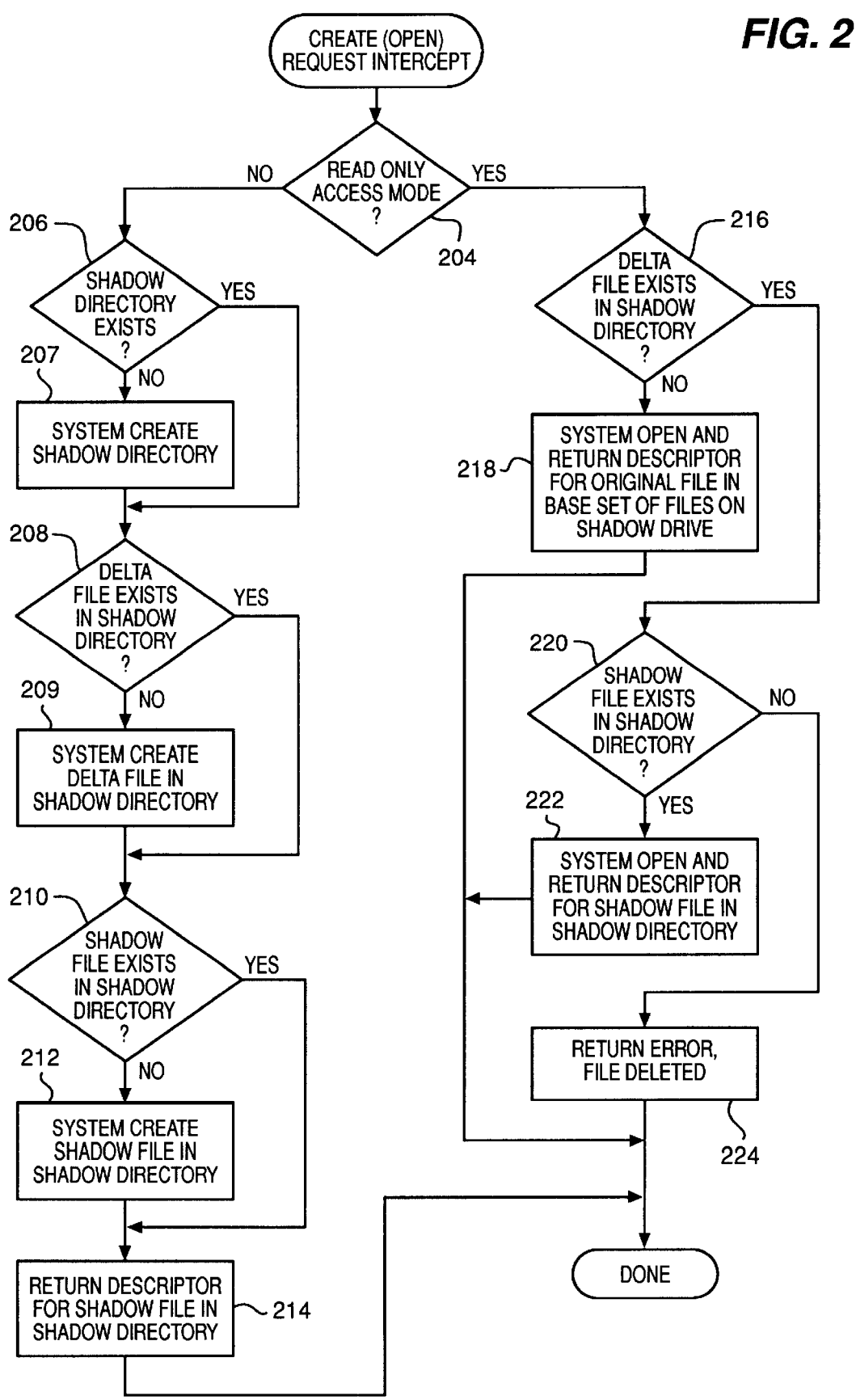
FIG. 2 is a flowchart describing a preferred embodiment of the incremental file system of the present invention which intercepts create/open file API requests.
Figure 3:
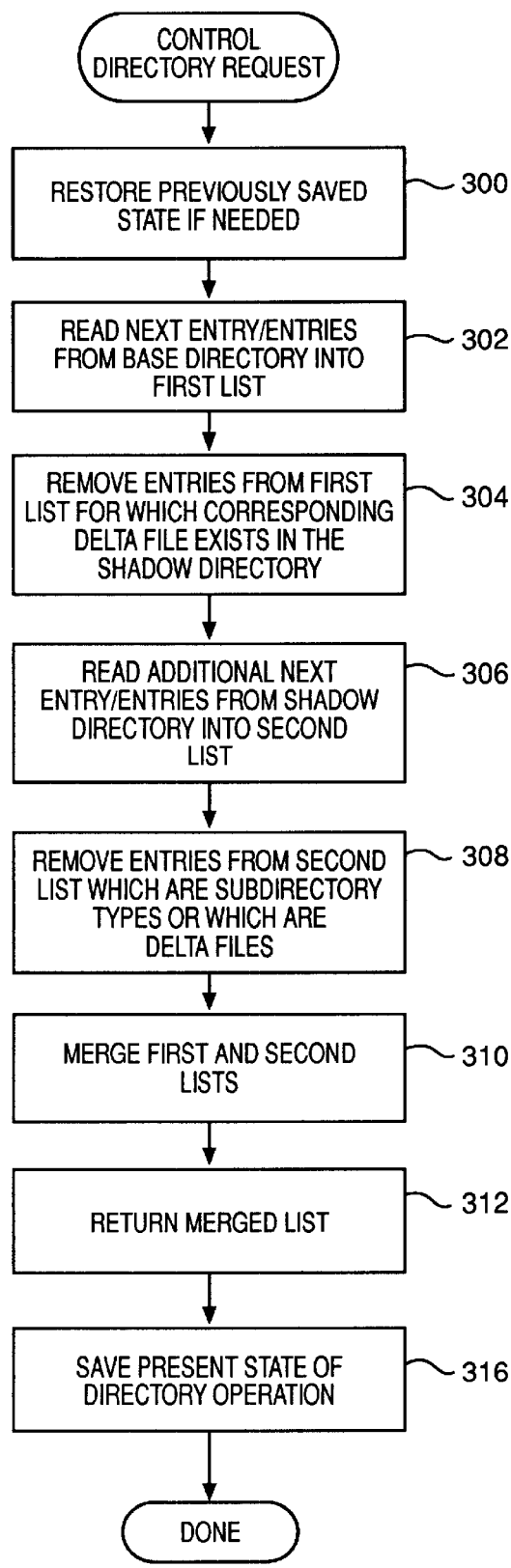
FIG. 3 is a flowchart describing a preferred embodiment of the incremental file system of the present invention which intercepts directory control requests.

FIGS. 2 and 3 further describe the methods of the present invention in accordance with the preferred embodiment and best presently known mode of practicing the invention. The methods depicted in the flowcharts of FIGS. 2 and 3 describe the incremental file system methods operable within IFS 122 in data processing systems 100 and 102 as shown in FIG. 1. In particular, in the preferred embodiment and best presently known mode of practicing the invention, IFS 122 intercepts file create requests generated by sessions. As used herein, "file create request" refers to operations which create or open files stored in a file system on an underlying mass storage subsystems coupled to data processing system (either locally or remotely). As noted above, coupling of a storage system to a data processing system may be via local means or through remote network computing techniques well-known to those skilled in the art. The file creation requests are a common technique used in many present data processing systems for initially opening an existing identified file or initially creating an identified file. For example, in the Unix and Windows computing environments, Posix standard file system API functions provide for a create and open operation as analogous techniques (even synonymous techniques) for gaining access to an identified file. Among the other parameters provided in such API functions is an access mode indicia. The access mode indicia parameter identifies or otherwise indicates the type of access requested by the session opening or creating the identified file. The Posix API standards include, for example, read-only access in which the session requests that the file be opened only for reading purposes as distinct from other purposes which may modify the file contents. For purposes of the present invention, other forms of access which may modify the file contents are collectively referred to as non-read-only access. Such non-read-only access includes access for purposes of writing to contents of the file, renaming the file, deleting the file, and other operations which may modify the file contents, name, attributes, or very existence. Those skilled in the art will recognize a number of similar parameters and API functions available for use in a variety of computing environments and operating systems for providing related capabilities and functions.

In the preferred embodiment and the best presently known mode of practicing the invention, IFS 122 is implemented as an installable file system filter in the Windows computing environment (or equivalently as a file system filter at the v-node layer in the Unix computing environment). As known to those skilled in the art, and installable file system filter is dynamically integrated with the operating system and file system of a computing environment. An installable file system filter intercepts file access API function invocations, performs any desired transformation or translation of the requested function, and then performs any required lower-level file manipulation operations using standard file access API functions built into the operating system and file system of the computing environment (or by direct lower level system calls to the file system). API functions intercepted by the installable file system filter which require no special purpose processing may be forwarded directly onto the standard operating system and file system functions of the computing environment. In the best presently known mode of practicing the invention, only the create/open API function need be intercepted for special processing to manipulate files in a shared, common base set of read-only files. As detailed further herein below with respect to FIG. 3, other API functions are intercepted and processed for purposes of accessing the directory structure of the shared, common base set of read-only files managed by the incremental file system of the present invention.

IFS File Access Interception and Redirection Methods

Specifically with respect to FIG. 2, element 204 is first operable to determine if the access mode indicia indicates that the request is for read-only access to the identified file. When element 204 determines that read-only accesses been requested, elements 216–224 are then operable within the incremental file system of the present invention to redirect the further read-only access requests (i.e., file read requests) to a shadow copy of the identified file if it exists, or the base file otherwise. Where element 204 determines that non-read-only access has been requested, elements 206–214 are operable to redirect further non-read-only access (i.e., write, rename, delete, etc.) to an appropriate shadow copy of the identified file.

Elements 206–214 are operable to redirect further non-read-only access to to an identified file in intercepted create/open request to a shadow copy of the identified file. In particular, element 206 is first operable to determine whether a shadow directory (second storage area) has been created corresponding to the requesting session. As noted above, each session which modifies files in the base set of read-only files (first storage area) is associated with a corresponding shadow directory (second storage area) in which shadow copies of modified files are stored. The first time such a non-read-only access mode is indicated on an intercepted create/open request, such a shadow directory will be set up for the requesting session. If element 206 determines that no such shadow directory has been created corresponding to the requesting session, element 207 is next operable to create a shadow directory corresponding to the requesting session. In either case, processing then continues with element 208.

Element 208 is then operable to determine if a delta file corresponding to the identified file already exists in the shadow directory associated with the requesting session. If element 208 determines that no delta file presently exists in the shadow directory, element 209 is next operable to create a delta file associated with the identified file in the shadow directory corresponding to the requesting session. As used herein "delta file" means any indicia stored in the shadow directory to indicate that the identified file in an intercepted create/open request may be modified and that a corresponding shadow copy of the file may be stored in the shadow directory. Exemplary of such delta file indicia would be a zero length file having a name identical to that of the identified file with an appended suffix identifying the file as a delta file. In the preferred embodiment such an appended suffix is a string appended to the file name of the identified file. For example, the string ".#DELTA#" or other unique character strings are appended to the file name of the identified file and a file with that file name is created in the shadow directory. The presence of such a delta file in the shadow directory is indicative of the fact that a (possibly) modified copy of the identified file now resides in the shadow directory for further non-read-only access to the file by the corresponding session. Those skilled in the art will further recognize other equivalent indicia may be used as a flag to denote the fact that an identified file may be modified pursuant to the directions of a session generating and open or create request for non-read-only access.

Elements 210 and 212 are then operable to determine whether a shadow file presently exists in the shadow directory associated with the requesting session. If element 210 determines that a shadow file already exists in shadow directory, processing continues with element 214. If element 210 determines no such shadow file presently exists in the shadow directory, element 212 is next operable to create a shadow file in the shadow directory by copying the present contents and attributes of the identified file (the original file) into the shadow directory. In the preferred embodiment, the shadow file shares the same name as the original file (identified file).

Element 214 is then operable to return an appropriate handle or descriptor for the newly created (or previously created) shadow file in the shadow directory. Elements 206–214 thereby create a shadow copy of a file identified by a create/open request in preparation for further access which may modify the contents of the file. Such further access may include API functions to write the contents of the file, thereby modifying its contents, as well as API functions to delete the file, thereby removing it from existence as a shadow file in the shadow directory for the corresponding requesting session.

As noted above, such modifications and deletions of files are performed only on the shadow copies (shadow files) stored in the shadow directory associated with a corresponding requesting session. Changes made by one session therefore do not affect the base set of read-only files shared by multiple sessions. As noted elsewhere herein, the first storage area in which the common base set of read-only files are stored may in fact be a read-only storage medium such as a CD-ROM. Creation and modifications made to a shadow file in a shadow directory corresponding to a particular session are therefore transparent to that session in that the session may open and modify files believing that it is modifying the shared common base set of read-only files while the incremental file system of the present invention stores all such modifications only in the shadow directory corresponding to the requesting session. Elements 216–224, as noted above, redirect further access identified in intercepted create/open requests to particular modified versions of files as stored in the shadow directory corresponding to the requesting session.

Where element 204 determines that in intercepted create/open request is requesting read-only access to the identified file, elements 216–224 redirect further access to the identified file to an appropriate version of the identified file. Specifically further read access will be performed on the original file (identified file) stored in the base set of read-only files in the first storage area when no shadow copy is found to exist in the shadow directory associated with the requesting session. Where, on the other hand, a shadow copy of the identified file is found in the shadow directory, further read access to the identified file will be redirected to the shadow copy. In this manner, the incremental file system of the present invention transparently provides the requesting session with all modified data as previously written to the shadow copy where such a shadow copy has been created.

Specifically, element 216 is first operable to determine whether a delta file presently exists in the shadow directory corresponding to the requesting session. If no such delta file exists, element 218 is next operable to open the identified file as the original file stored in the base set of read-only files on the shadow drive (the first storage area). An appropriate descriptor or handle for the opened original file is returned to the requesting session thereby completing the method.

Where element 216 determines that a delta file presently exists in the shadow directory, element 220 is next operable to determine whether a shadow file presently exists in the shadow directory corresponding to the requesting session. If element 220 determines that a shadow file presently exists in the shadow directory, element 222 is next operable to open the shadow file corresponding to the identified file previously copied to the shadow directory (and potentially previously modified by earlier write access to the shadow file). As above, an appropriate descriptor or handle for the opened shadow file is returned to the requesting session thereby completing processing of the method. Where element 220 determines that no shadow file presently exists in the shadow directory corresponding to the requesting session, element 224 is operable to return an error status to the requesting session indicating that the identified file has been deleted by previous modifications to the identified file (or never existed as an original file in the base set of read-only files). Such an error status return completes processing of the method.

Elements 216–224 therefore redirect read-only access to an identified file to an appropriate version of the identified file. Specifically, where prior modifications (or deletions, etc.) modified the contents or existence of the original file (identified file) in the base set of read-only files, elements 216–224 redirect further read-only access to the shadow copy of the original file in the shadow directory corresponding to the requesting session. If no modifications have been made by the requesting session to the identified file in the base set of read-only files, elements 216–224 redirect further read-only access to the original file in its unmodified form as stored in the shared common base set of read-only files.

Elements 207, 209, 212, 218, and 222 refer to system create and system open operations as distinct from create/open requests intercepted by the incremental file system of the present invention and described in FIG. 2. Such system create and system open operations refer to lower-level operations provided by the OS/FS of the particular computing environment. In other words, system open or system create requests are not intercepted by the incremental file system of the present invention but rather are directed to the standard file system operations of the computing environment.

IFS Directory Control Intercept Methods

Those skilled in the art will note that the flowchart of FIG. 2 does not process create functions invocations directed to a directory entry rather than a file in a directory. The above described method may be trivially enhanced to process such directory requests and to shadow the directory structure of the shadow drive. In the the best presently known mode of practicing the invention, the directory structure of the shadow drive is unmodified in the shadow directory. In other words, subdirectories in the paths of files of the base set of files are mirrored in the shadow directory structures. It is deemed of little value to modify the directory tree structure of the shadow drive in the shadow directory. The potential benefit in so doing arises from the ability of a session to create or delete an entire directory. In the preferred embodiment it is believed to be sufficient to permit the shadow files and shadow directory to reflect the deletion of all files from a directory while leaving the seemingly empty directory itself intact. In view of this design choice, it is only necessary to process directory control requests to reflect the shadowed nature of the shadow drive. Specifically, directory control requests used to read directory entries indicative of the existence and attributes of files in the directories need be processed by the incremental file system of the present invention.

FIG. 3 is a flowchart describing a method operable to process intercepted directory control requests for an identified directory as distinct from an identified file. Those skilled in the art will recognize that standard (i.e., Posix compliant) API file system functions include special directory control functions particularly designed for manipulation of directories and subdirectories. Further, those skilled in the art will recognize that some such API file system functions used for directory manipulation are state based in that subsequent invocations of the API functions may request continuation of the operations performed by a previous invocation of such API file system functions. The method described in FIG. 3 therefore includes state saving and restoring elements for purposes of continuing such directory manipulation requests.

Element 300 is first operable to restore any requisite state information saved from a previous invocation of a directory control API function. As noted above and discussed further below, the specific detailed information to be so restored is a matter of design choice as dictated by the particular computing environment.

Element 302 is next operable to read the next requesting entry or entries from the identified directory into a first temporary list. Those skilled in the art will recognize that directory manipulation operations often request return of one or more directory entries in a single operation. The first temporary list therefore is a list of such requested entries, temporary in the sense that further manipulation and processing will take place before the entries so read are returned to the requesting session. Element 304 next removes (prunes) entries from the first temporary list for which corresponding delta files are determined to exist in the shadow directory corresponding to the requesting session. Where a delta file corresponding to a directory entry read from the first storage area (the common base set of read-only files), the directory entry is pruned from the first temporary list. Such a file may have been deleted by modification requests from the corresponding session.

Element 306 is then operable to read additional next entries from the shadow directory corresponding to the requesting session. Such additional entries are read into a second temporary list to wait further processing. Element 308 then removes (prunes) entries read into the second temporary list. Entries which represent subdirectories are pruned so that be directory tree structure reflects that of the original base set of read-only files in the first storage area (these entries were already reported in the first temporary list). Secondly, files with directory entries in the second temporary list which represent delta files are removed (pruned) from the second temporary list. Such delta files are intended by the incremental file system of the present invention to be transparent (i.e., hidden) from the session. As noted above, such delta files are intended merely as indicia of the fact that a particular session has modified or deleted an original file from the base set of read-only files in the first or area. As noted above, a directory entry read into the first temporary list having a corresponding delta file entry in the shadow directory was pruned from the first temporary list. The file will be included among the directory entries read from the shadow directory unless the file was deleted by the corresponding session. As noted above, when a session deletes a file, the delta file remains in the shadow directory as indicia of the fact that modifications (in this case a deletion) of the original file were made by the session.

Element 310 is then operable to merge entries in the first and second temporary lists following pruning operations of element 304 and 308. The lists are merged for purposes of returning a single list of directory entries representing the join of directory entries from the first storage area (the shadow drive) as modified by directory entries in the second storage area (the shadow directory). Element 312 is then operable to return the merged list of directory entries to the requesting session.

As noted above, those skills in the art will recognize that directory manipulation API functions in many common file system computing environments are state based in that operations may continue from one invocation to the next. Element 316 is therefore operable to save the present state of the directory manipulation operation. Specific state information to be saved is implementation dependent and represents a well-known design choice consideration for those skilled in the art.

File Access Interception and Redirection—Alternate Methods

Figure 4:
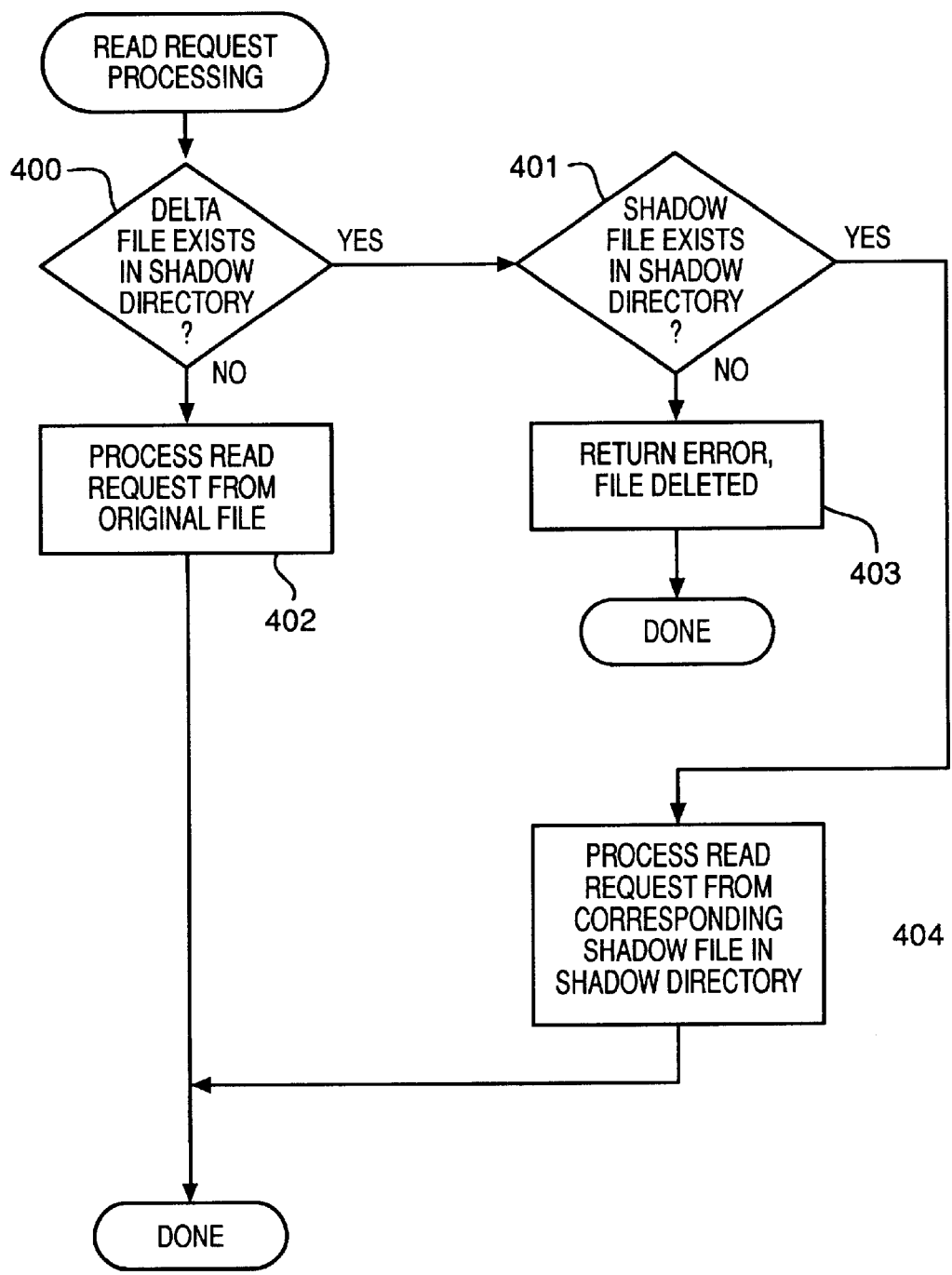
FIG. 4 is a flowchart describing an alternate embodiment of the incremental file system of the present invention wherein read file API functions are intercepted.
Figure 5:
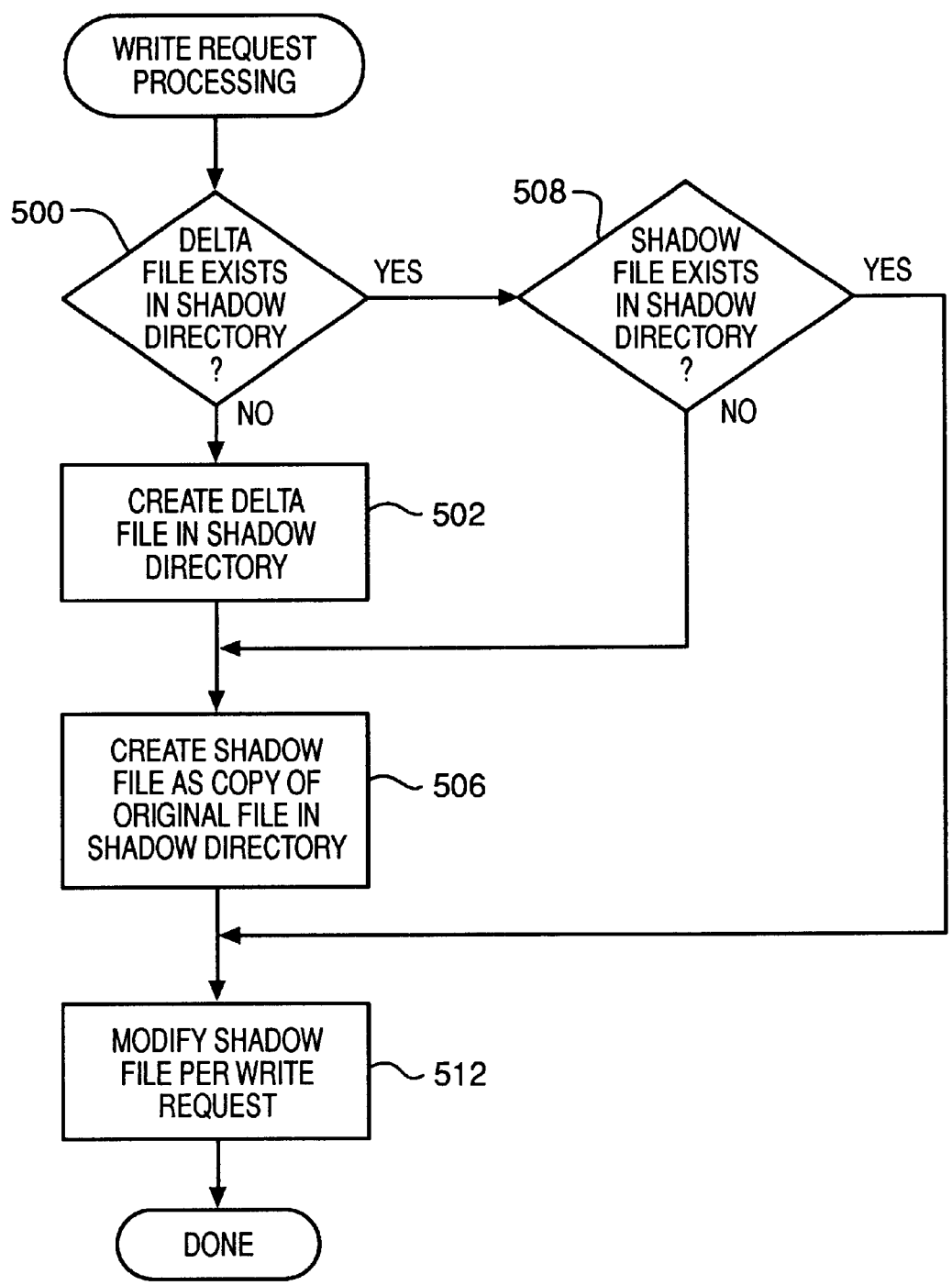
FIG. 5 is a flowchart describing an alternate embodiment of the incremental file system of the present invention wherein write file API functions are intercepted.

FIGS. 2 and 3 described herein above are representative of the best presently known mode of implementing the present invention. All file access is initiated in most common computing environments by first invoking a file create/open operation as described in FIGS. 2 and 3 above. However, some computing environments may perform file read and write (modification) operations without first explicitly invoking a file create/open API request. FIGS. 4 and 5 therefore represent a second preferred embodiment of the present invention wherein a shadow copy of an identified file is created and utilized in conjunction with each individual read or write request.

This second embodiment may also be advantageously combined with the first embodiment. For example, the first embodiment would create a shadow file in the shadow directory any time a session opened a file in the shadow drive for possible writing or modification. Although the session may in fact never modify the opened file, the first embodiment described above would conservatively create the shadow file. This second embodiment may be combined therefore in that the creation of the shadow file could be deferred until an actual write request were received which modifies the opened file in some manner.

In particular, FIG. 4 represents processing of a read request in accordance with the incremental file system of the present invention while FIG. 5 represents write request processing in accordance with a second preferred embodiment of the present invention. As used herein with respect to FIG. 5, a write request is any request that may modify the file contents or the file attributes.

Element 400 of FIG. 4 is first operable to determine whether a delta file already exists in the shadow directory (second storage area) corresponding to the requesting session. If no such delta file presently exists in the shadow directory, element 402 is next operable to process the read request from the original file (identified file) in the first storage area (common base set of read-only files). The read data thereby is then returned to the requesting session thereby completing processing of the method.

Where element 400 determines that the delta file already exists in the shadow directory corresponding to the requesting session, element 401 is then operable determine whether the shadow file exists in the shadow directory. If no shadow directory exists (but the delta file was created indicating a deleted file), element 403 is operable to return an error status to the requesting session indicative of a deleted file. Otherwise, element 404 is next operable to process the read request from the corresponding shadow file (shadow copy) stored in the shadow directory (second storage area) corresponding to the requesting session. Read data thereby retrieved is then returned to the requesting session thereby completing processing of the method.

Element 500 of FIG. 5 is first operable, in a manner analogous to that of element 400 above, to determine if a delta file already exists in the shadow directory (second storage area) corresponding to the requesting session. If no such delta file presently exists in the shadow directory, element 502 is next operable to create the delta file, corresponding to the identified file, in the shadow directory corresponding to the requesting session. Implied in the operation of element 502 is the processing required to create the shadow directory itself if it is not yet created. Element 506 is next operable to create a shadow file by copying the contents and attributes of the original file (identified file in the first storage area) into the shadow directory (second storage area corresponding to the requesting session). Element 512 is then operable to modify the shadow file in accordance with the write request.

Where element 500 determines that a delta file already exists in the shadow directory corresponding to the requesting session, element 508 is then operable to determine whether a shadow file already exists in the shadow directory. If such a shadow file is determined to already exist in the shadow directory (second storage area corresponding to the requesting session), element 512 is next operable as described above to modify the existing shadow file in accordance with the write request. If element 508 determines that no such shadow file presently exists in the shadow directory, element 506 and 512 are next operable as described above to create a shadow file and to modify the contents of the shadow file in accordance with the write request.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. An incremental file system comprising:
   a first storage area for storing files wherein said first storage area stores each original file of a plurality of related files and wherein said first storage area is accessible to multiple processes;
   a second storage area for storing delta files wherein said second storage area is accessible to, and is associated with, one process of said multiple processes;
   a file creation interceptor to intercept a file create request by said one process directed to an original file stored in said first storage area wherein operation of said file interceptor is transparent with respect to said one process; and a file access redirector, coupled with said file creation interceptor, for directing further read and write access to said original file by said one process in accordance with the existence of a delta file stored in said second storage area and corresponding to said original file wherein operation of said file access redirector is transparent with respect to said one process and wherein said second storage area includes fewer delta files than the number of said related files in said first storage area.

2. The incremental file system of claim 1 wherein said file create request includes an access mode indicia and wherein said file access redirector includes:

a delta file locator to locate said delta file in said second storage area;

a first file redirector element for redirecting said further access to said original file in response to a determination that said access mode indicia is indicative of read-only access to said original file and that said delta file locator fails to locate said delta file; and a second file redirector element for redirecting said further access to a shadow file stored in said second storage area in response to a determination that said access mode indicia is indicative of read-only access to said original file and that said delta file locator succeeds in locating said delta file.

3. The incremental file system of claim 1 wherein said file create request includes an access mode indicia and wherein said file access redirector includes:

a delta file creator for creating said delta file in said second storage area in response to a determination that said access mode indicia is indicative of non-read-only access to said original file; and a shadow file creator for creating a shadow file in said second storage area in response to a determination that said access mode indicia is indicative of non-read-only access to said original file.

4. The incremental file system of claim 1 wherein the first storage area is a read-only storage medium.

5. The incremental file system of claim 1 wherein the first storage area is a network storage medium remote with respect to said second storage area.

6. The incremental file system of claim 1 wherein the second storage area is associated with a particular session using said incremental file system.

7. The incremental file system of claim 1 wherein said file access redirector includes:

a first directory entry reader for reading a next entry in said original file in response to a determination by said file type comparator that said original file is a directory file type;

a first directory entry pruner for pruning entries read by said first directory entry reader;

a second directory entry reader, responsive to operation of said first directory entry reader, for reading a next entry in said second storage area; and a second directory entry pruner for pruning entries read by said second directory entry reader.

8. The incremental file system of claim 7
wherein said first directory entry pruner is operable to prune an entry read by said first directory entry reader for which a corresponding delta file exists in said second storage area, and
wherein said second directory pruner is operable to prune an entry read by said second directory entry reader which is a directory file type or which is a delta file corresponding to a file in said first storage area.

9. In a system having a first storage area for storing a plurality of original files and a second storage area for storing delta files corresponding to said original files, a method for managing files comprising the steps of:

intercepting a file create request by a process directed to an original file stored in said first storage area wherein the step of intercepting is transparent with respect to said process; and redirecting further read and write access by said process to said original file in accordance with the existence of a delta file stored in said second storage area and corresponding to said original file and stored in said second storage area wherein the step of redirecting is transparent with respect to said process.

10. The method of claim 9 wherein said file create request includes an access mode indicia and wherein the redirecting step includes:

locating said delta file in said second storage area;

redirecting said further access to said original file in response to a determination that said access mode indicia is indicative of read-only access to said original file and that said delta file locator fails to locate said delta file; and redirecting said further access to a shadow file stored in said second storage area in response to a determination that said access mode indicia is indicative of read-only access to said original file and that said delta file locator succeeds in locating said delta file.

11. The method of claim 9 wherein said file create request includes an access mode indicia and wherein the redirecting step includes:

creating said delta file in said second storage area in response to a determination that said access mode indicia is indicative of non-read-only access to said original file; and creating a shadow file in said second storage area in response to a determination that said access mode indicia is indicative of non-read-only access to said original file.

12. The method of claim 9 wherein the first storage area is a read-only storage medium.

13. The method of claim 9 wherein the first storage area is a network storage medium remote with respect to said second storage area.

14. The method of claim 9 wherein the second storage area is associated with a particular session using said incremental file system.

15. The method of claim 9 wherein the redirecting step includes:

reading a next entry in said original file in response to a determination by said file type comparator that said original file is a directory file type;

pruning entries read by reading of said next entry in said original file;

reading a next entry in said second storage area in response to reading of said next entry in said original file; and pruning entries read by reading of said next entry in said second storage area.

16. The method of claim 15
wherein the step of pruning entries read by reading of said next entry in said original file is operable to prune an entry for which a corresponding delta file exists in said second storage area, and wherein is the step of pruning entries read by reading of said next entry in said second storage area operable to prune an entry which is a directory file type or which is a delta file corresponding to a file in said first storage area.

17. A system comprising:

a first storage medium;

a base set of files stored on said first storage medium;

a second storage medium; and a computer coupled to said first storage medium and coupled to said second storage medium wherein said computer includes:

write means for processing a write request from a process operating in said computer for an identified file of said base set of files wherein said write means is operable to create a delta file corresponding to said identified file wherein said delta file is stored in said second storage medium and wherein said write means is further operable to store changes in accordance with said write request in a shadow file corresponding to said identified file wherein said shadow file is stored on said second storage medium; and read means for processing a read request from said process operating in said computer for requested information from said identified file wherein said read means is operable to retrieve said requested information from either said identified file in said first storage medium or from said shadow file in said second storage medium in accordance with existence of a delta file corresponding to said identified file, wherein use of said delta file and of said shadow file by said read means and by said write means is transparent with respect to said process.

18. The system of claim 17 wherein said read means includes:

means for locating said delta file corresponding to said identified file;

first means, responsive to failure of said means for locating to locate said delta file, for retrieving information requested by said read request from said identified file; and second means, responsive to said delta file locator successfully locating said delta file, for retrieving information requested by said read request from said shadow file.

19. The system of claim 17 wherein said first storage medium comprises a read-only storage medium.

20. The method of claim 17 wherein said first storage medium comprises a network storage medium remote with respect to said computer.

21. The system of claim 17 wherein said second storage medium is associated with a particular session operable in said computer.

22. In a data processing system, a method for managing files comprising the steps of:

receiving a write request from a process operable in said data processing system for changes to an original file stored in a first storage medium associated with said data processing system;

modifying a shadow file in a second storage medium associated with said data processing system in accordance with said changes indicated by said write request;

creating a delta file in said second storage medium indicative of the operation of the modifying step;

receiving a read request for information stored in said original file; and retrieving said information requested by said read request from either said original file in said first storage medium or from said shadow file in said second storage medium in accordance with existence of said delta file, wherein use of said delta file and of said shadow file is transparent with respect to said process.

23. The method of claim 22 wherein the step of retrieving includes the steps of:

locating said delta file;

retrieving said information requested by said read request from said original file in response to failure of the locating step to locate said delta file; and retrieving said information requested by said read request from said shadow file in response to the locating step successfully locating said delta file.

24. The method of claim 22 wherein said first storage medium comprises a read-only storage medium.

25. The method of claim 22 wherein said first storage medium comprises a network storage medium remote with respect to said second storage medium.

26. The method of claim 22 wherein said second storage medium is associated with a particular session using said method.

* * * * *